UNITED STATES PATENT OFFICE.

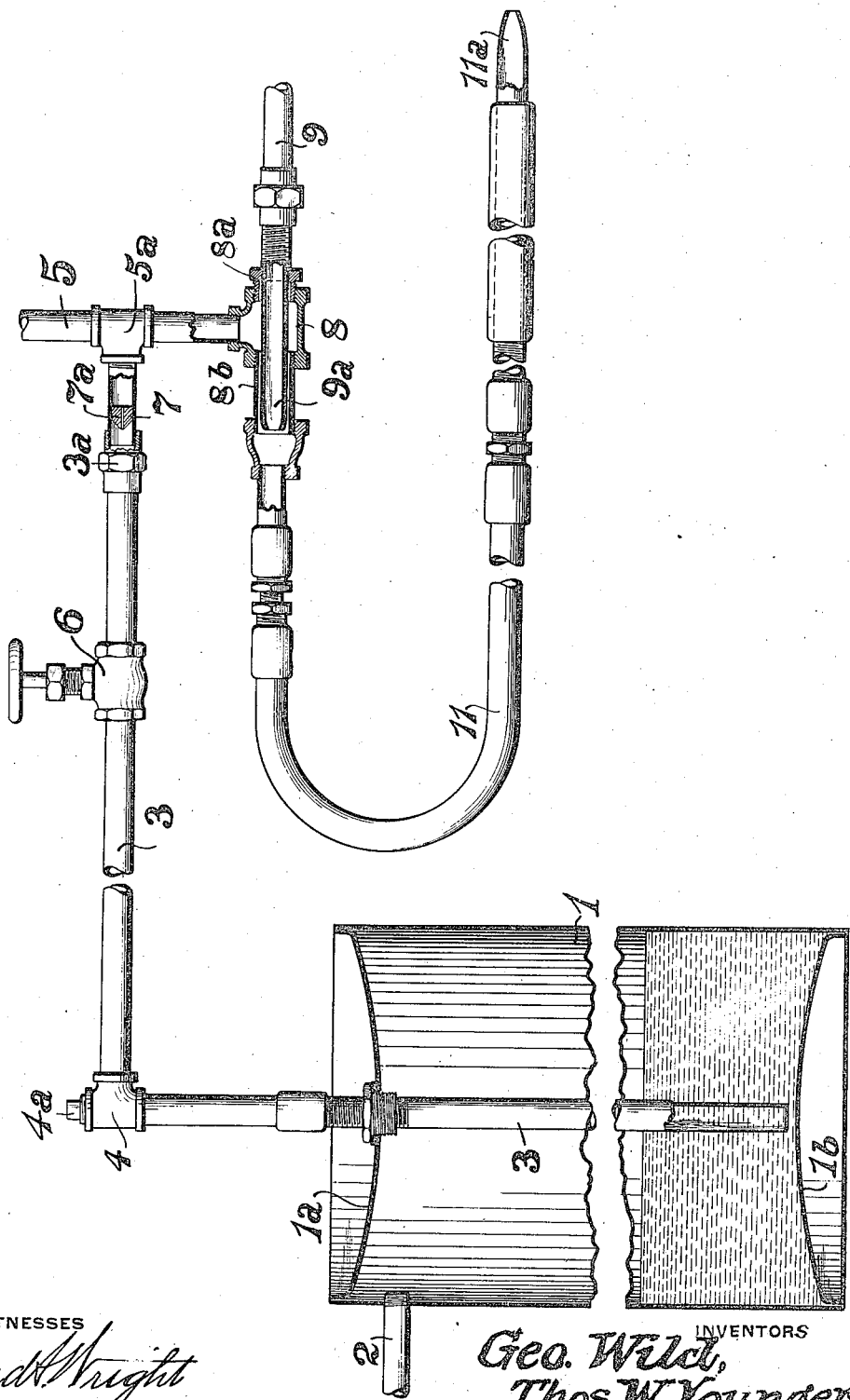

GEORGE WILD, OF PORTLAND, OREGON, AND THOMAS W. YOUNGER, OF SACRAMENTO, CALIFORNIA.

APPARATUS FOR APPLYING CLEANSING LIQUIDS.

1,174,372. Specification of Letters Patent. Patented Mar. 7, 1916.

Application filed November 4, 1915. Serial No. 59,689.

*To all whom it may concern:*

Be it known that we, GEORGE WILD, of Portland, in the county of Multnomah and State of Oregon, and THOMAS W. YOUNGER, of Sacramento, in the county of Sacramento and State of California, have jointly invented a certain new and useful Improvement in Apparatus for Applying Cleansing Liquids, of which improvement the following is a specification.

Our invention relates to apparatus for effecting the application, by fluid pressure, of a cleansing liquid, as a mixture of oil and water, to the surfaces of structures, particularly locomotive engines and other railroad vehicles, for the purpose of rapidly and thoroughly removing dirt and other foreign matter therefrom, and its object is to provide an appliance for such service which shall be of simple and inexpensive construction, reliable in its operation, and capable of being readily taken apart and assembled, for inspection or repair, as desired.

The improvement claimed is hereinafter fully set forth.

The accompanying drawing is a view, partly in elevation and partly in section, of an apparatus illustrating an embodiment of our invention.

In the practice of our invention, we provide a supply reservoir, 1, for the reception of the oil which forms a constituent of the cleansing liquid, said reservoir having tight heads, 1ª, 1ᵇ, and a suitable filling opening, closed by a removable plug, and a discharge pipe. In the instance exemplified, the delivery of oil from the reservoir is designed to be effected by air under pressure, which enters the reservoir through a pipe, 2, near its top, and by its pressure on the surface of the oil, forces it out of the reservoir through a discharge pipe, 3, which passes through the top head, 1ª, of the reservoir and extends nearly to its bottom. The discharge pipe also serves as a filling passage, a pipe T, 4, being connected to the upper end of the section of the discharge pipe which passes into the reservoir, and being closed at its outer end, by a removable screw plug, 4ª. This specific construction of filling and discharge members is not, however, an essential feature of our invention, as the supply reservoir may, if desired, be located at a height sufficient to permit the discharge of oil by gravity, in which case, the air pressure pipe, 2, would be dispensed with, the discharge pipe, 3, would lead outwardly and downwardly from the lower portion of the reservoir, and an ordinary filling opening and plug or cock would be provided in the upper portion thereof.

Another section of the discharge pipe extends from the first section, through the side opening of the pipe T, 4, to a water supply pipe, 5, to which it is connected by a pipe T, 5ª, and a globe valve, 6, for regulating the delivery of oil, is fitted in the discharge pipe. A union, 3ª, is also fitted in the discharge pipe, and is provided with a wire gage partition for filtering the oil, and a plug 7, having a small central opening, 7ª, which is enlarged at and adjoining its delivery end, is fitted in the discharge pipe, between the union, 3ª, and the water supply pipe, 5. The delivery end of the water supply pipe is connected to the side opening of a pipe T, 8, one of the end openings of which is closed by a screw plug, 8ª, through which extends the delivery nozzle, 9ª, of a steam supply pipe, 9, leading from a steam boiler and controlled by a suitable cock or valve in the ordinary manner. The discharge opening of the delivery nozzle, 9ª, is surrounded by a pipe nipple, 8ᵇ, one end of which is connected to the pipe T, 8, and the other to a reduced fitting, 10. A section of flexible hose, 11, is connected detachably to the smaller end of the reducer, 10, and carries, on its outer end, a discharge nozzle, 11ª.

In the operation of an appliance embodying the essentials of that above described, oil, which is fed from the supply reservoir, 1, either by air pressure or by gravity, passes, in volume regulated by the globe valve, 6, from the discharge pipe, 3, into the water supply pipe, 5, and pipe T, 8, and is mingled, as a finely divided spray, with the large excess of volume of water delivered by the pipe, 5, the proportions being about 600 parts of water to 1 part of oil. The mixture of water and oil is forced by the exhausting action of the pressure of the current of steam discharged from the nozzle, 9ª, of the steam supply pipe, into the hose section, 11, from which it is sprayed over the structures to be cleaned, from the nozzle, 11ª. By reason of the relation of the steam discharge nozzle to the oil discharge and water supply pipes, neither the oil nor the water need be under pressure, and both may be used under a gravity feed.

It will be seen that under the above described construction, the forcing action of the current of steam is directly exerted upon the mixture of oil and water, without complication of parts, thereby effecting a corresponding reduction of cost of construction, and promoting facility of separation and connection as required.

We claim as our invention and desire to secure by Letters Patent:

An apparatus for applying cleansing liquids, comprising in combination a water supply pipe, an oil reservoir, a pipe leading from the latter into the former, a pipe T, into one side of which said supply pipe leads, a steam ejector nozzle passing longitudinally through said T, a pipe nipple connected to said T and surrounding the front end of said nozzle so as to leave an annular space around the same, a reducing fitting connected to the end of said nipple in which the steam and oily water are mixed, and a delivery nozzle flexibly connected to said reducing fitting.

GEORGE WILD.
THOMAS W. YOUNGER.

Witnesses as to Geo. Wild:
  Roy B. Kelly,
  C. F. Degerwood.

Witnesses as to T. W. Younger:
  R. B. Carlton,
  F. B. Schomky.